United States Patent [19]

Emme

[11] 4,262,948
[45] Apr. 21, 1981

[54] METHOD AND MEANS FOR DISPOSING OF ANIMAL WASTE

[75] Inventor: Harry W. Emme, Jensen Beach, Fla.

[73] Assignee: Clifton T. Hunt, Charlotte, N.C.

[21] Appl. No.: 33,117

[22] Filed: Apr. 25, 1979

Related U.S. Application Data

[63] Continuation of Ser. No. 967,881, Dec. 8, 1978.

[51] Int. Cl.$^3$ .................................................. A01K 29/00
[52] U.S. Cl. ........................................................ 294/1 BB
[58] Field of Search 294/1BB, 1BA, 19R, 57; 15/257.1, 257.6; 248/99, 100, 161; 119/1 R

[56] References Cited

U.S. PATENT DOCUMENTS

| | | | |
|---|---|---|---|
| 2,763,506 | 9/1956 | Denker et al. | 294/57 |
| 3,872,831 | 3/1975 | Cassidy | 294/1 BB |
| 4,042,269 | 8/1977 | Skermetta | 294/1 BB |

*Primary Examiner*—James B. Marbert
*Attorney, Agent, or Firm*—Clifton T. Hunt

[57] ABSTRACT

A portable and easily handled collection device is manually carried by a person walking a dog and a disposable container which forms a part of the collection device is positioned beneath the dog when it haunches for excrement. The droppings are caught in the disposable container instead of falling to the ground. The disposable container is easily removed from the collection device and discarded as waste in a suitable sanitary manner. The collection device comprises a foldable handle and means at one end of the handle for releasably supporting a disposable container.

2 Claims, 5 Drawing Figures

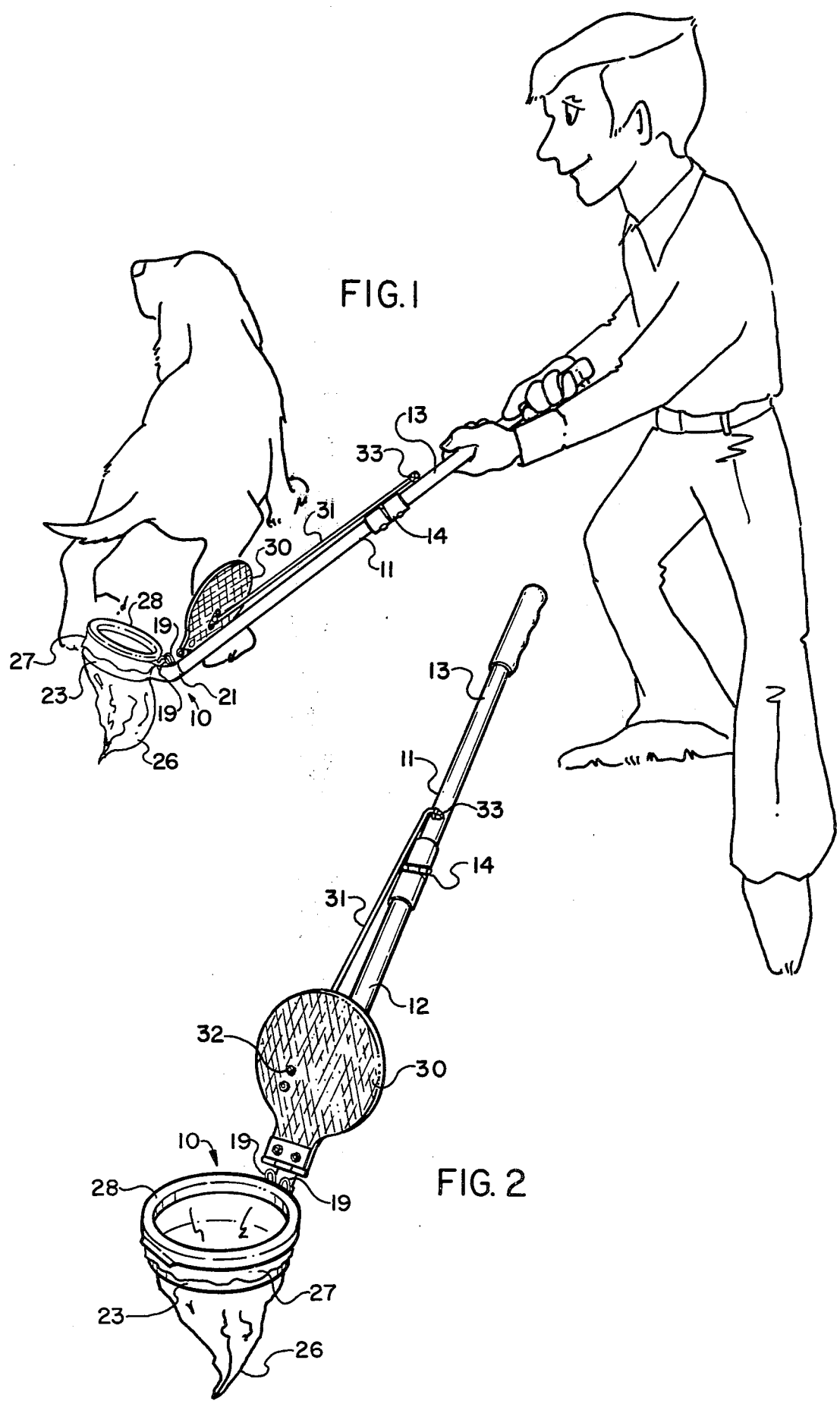

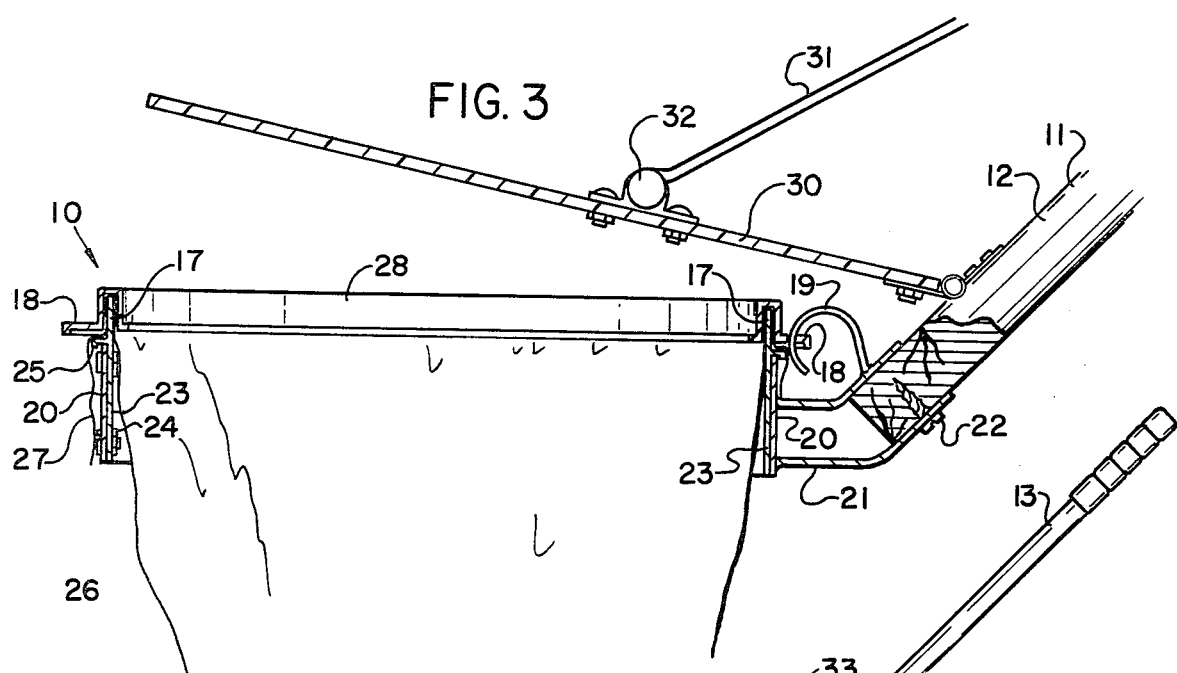
FIG. 3
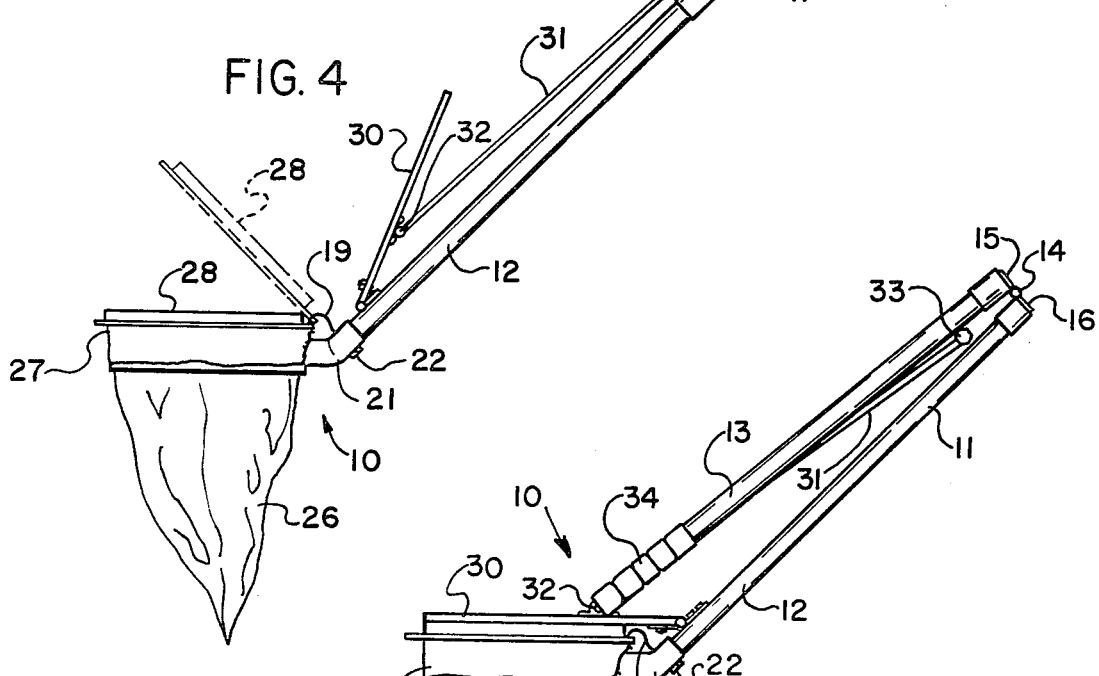
FIG. 4
FIG. 5

METHOD AND MEANS FOR DISPOSING OF ANIMAL WASTE

CROSS-REFERENCE TO RELATED APPLICATIONS

This is a continuation of application Ser. No. 967,881, filed Dec. 8, 1978 and entitled METHOD AND MEANS FOR DISPOSING OF ANIMAL WASTE.

BACKGROUND OF THE INVENTION

As is well known, the removal of dog droppings from city streets has become such a problem that New York, San Francisco and possibly other cities have passed ordinances requiring the owner of the dog to remove the droppings left by their pets. The removal is done in a variety of ways, such as picking up the droppings with a paper towel and depositing them in a paper or plastic bag preparatory to the ultimate disposal. The patented art discloses a harness supported collection device which is carried completely by the pet rather than by the person. Such a device is shown in U.S. Pat. No. 3,875,903 issued Apr. 8, 1975 to Frank O. Sarvary. U.S. Pat. No. 3,656,459 issued Apr. 18, 1972 to Lewis Missud and U.S. Pat. No. 3,792,687 issued Feb. 19, 1974 to Alexander Ehrman show similar devices supported by the pet and not by its owner. In each of these prior art devices it is necessary for the owner to attach the collection device to his pet and to remove it after use, in addition to disposing of the filled container. The handling of the collection device and the fitting and adjustment of it to the pet are unpleasant manual tasks which are eliminated by means of the present invention.

SUMMARY OF THE INVENTION

According to the present invention, the collection device is entirely handled by the owner and nothing is attached to the pet. The owner and his pet walk in the conventional manner and when the dog haunches for excrement the owner unfolds the handle which automatically opens the cover above the collection bag to prepare the collection bag for positioning beneath the haunching dog to catch the droppings as they fall. The handle of the collection device may then be folded to automatically close the cover over the collection bag and provide a compact and easily managable assembly which may be conveniently carried to a place where the collection bag can be removed from the device and disposed of in a sanitary manner.

BRIEF DESCRIPTION OF THE DRAWINGS

FIG. 1 is a prespective view of a pet owner and his pet illustrating the manner in which the owner holds the collection device in operating position beneath the pet;

FIG. 2 is a perspective view of the collection device in extended operative position;

FIG. 3 is an enlarged fragmentary view, partially in section, of the operative end of the collection device showing the cover in partially raised position and illustrating the manner in which a removable container is supported on the collection device;

FIG. 4 is a view similar to FIG. 3 on a reduced scale showing the retaining ring in solid lines in its closed operative position and in phantom lines in its partially raised position; and FIG. 5 is a side elevation of the collection device in folded, inoperative position.

DETAILED DESCRIPTION OF THE INVENTION

Referring more specifically to the drawings, the reference numeral 10 broadly indicates a collection device comprising a foldable handle 11 which includes an operative end portion 12 and a free end or handle portion 13. A butt hinge 14 is suitably fixed to the proximal portions of operative end 12 and free end 13 of handle 11. The pivotal connection of hinge 14 is preferably arranged across the top of the handle in the operative position of FIGS. 1 and 2 so that the free end portion 13 may be folded over the operative end portion 12 when not in use, as shown in FIG. 5. The hinge 14 includes butt plates 15 and 16 (FIG. 5) which move into abutting relation when the free end portion 13 is folded to the right in FIG. 5 to assume the operative position of FIGS. 1 and 2. The butt plates 15 and 16 provide support for the collection device when the handle 11 is unfolded into its extended position and yet permits instant and convenient folding of the free end portion 13 for easy and convenient carrying when the collection device is not in use.

A circular support frame 20 having a socket 21 formed integral therewith or suitably secured thereto is fixed to the outer end of operative end portion 12 of handle 11 as by screw 22 or other suitable retaining device. The support frame 20 is of circular configuration or any desired configuration corresponding to that of a retaining rim 23 extending upwardly from support frame 20 in FIG. 3 and secured thereto as by screws 24 (FIG. 3) or by any other desired means.

The retaining rim 23 is preferably formed from smooth plastic and is attached to the inner surface of support frame 20 as most clearly seen in FIG. 3. The retaining rim 23 extends upwardly from the inner surface of support frame 20 and includes an annular flange 25 projecting outwardly across the upper edge of frame 20. Retaining rim 23 projects above annular flange 25 and terminates in an upstanding annular seat 17.

The inner diameter of the retaining rim 23 conforms with the diameter of any desired commercially available disposable plastic bag, indicated at 26, which is preferably opaque to conceal the nature of its contents when in use for its intended purpose. In practice, a disposable plastic bag 26 is placed inside retaining rim 23 with the closed end of bag 26 beneath the rim 23 in FIG. 3. The open end portions 27 of bag 26 are folded outwardly over the annular seat 17 and annular flange 25 on retaining rim 23, and then downwardly. The open end portions 27 of bag 26 are then supported about rim 23 by a retaining ring 28 which frictionally binds the ends of bag 26 between rim 23 and ring 28. Ring 28 is preferably made from plastic and is of inverted U-shaped cross-sectional configuration when positioned about the end portions 27 of bag 26 and rim 23 (FIG. 3). Ring 28 includes an annular flange 18 penetrated by retaining wires 19 extending from socket 21 for convenient retention of ring 28 on the assembly when a disposable bag 26 is being mounted or removed from the assembly.

A cover 30 is pivotally connected to operative end portion 12 of handle 11 adjacent or integral with socket 21. The cover 30 is arranged for movement with the operative end portion 12 of foldable handle 11 by a link 31 pivotally connected at its ends to cover 30 and the free end portion 13 of handle 11 as at 32 and 33, respectively. Thus, when the free end 13 of handle 11 is folded to its extended operative position as shown in FIGS. 1, 2 and 4, the cover 30 is raised to its open position. When the free end portion 13 of handle 11 is folded to its inoperative closed position the cover 30 is automatically moved into the closed position of FIG. 5.

In use, the owner of a pet may attach an empty bag 26 about the rim 23 and releasably attach it by positioning the retaining ring 28 over the free ends 27 of bag 26 before beginning a walk with the owner's pet. The owner carries the entire collection device with him on his walk and when the dog haunches for excrement the owner unfolds the handle from its closed position of FIG. 5 to the extended position of FIGS. 1, 2 and 4 thereby automatically moving the cover 30 to its open position where it is retained by link 31 until the free end 13 of handle 11 is returned to its closed inoperative position. The automatic movement of cover 30 to its open position coincident with the unfolding of free end portion 13 of handle 11 to its extended position enables the owner to quickly position the bag 26 instead of permitting it to fall on the ground. Thereafter, the free end portion 13 of handle 11 is returned to its closed inoperative position where the hand grip 34 engages the top surface of cover 30 in FIG. 5 to hold the cover in closed position while the collection device is carried to a point of convenient and sanitary disposal of bag 26 and its contents.

There is thus provided an effective and efficient method and means for disposing of animal waste which frees the owner from any cumbersome manual and menial activities while at the same time keeping the environment clean and promoting the health of others.

Although specific terms have been employed in describing the invention they are used in a descriptive sense only and not for purposes of limitation.

I claim:

1. Apparatus for disposing of animal waste comprising a handle, a support frame fixed to one end of the handle, a disposable bag having a closed end and an open end carried by said frame, an upstanding annular seat extending above the support frame and about which the open end of the bag extends, a retaining ring including an inverted U-shaped channel and cross-section dimensioned to snugly engage the bag on opposite sides of the seat and frictionally retain the bag on the seat with the bag's closed end beneath the frame, said handle including an operative end portion and a free end portion typically connected together at their proximal portions, a cover pivotally connected to said operative end portion, a link extending between the cover and the free end portion of the handle and means pivotally connecting the link to the cover and to the handle and responsive to movement of the free end portion of the handle and its closed position overlying the operative end portion of the handle to move the cover to its closed position overlying the support frame and disposable bag and responsive to movement of the free end portion of the handle to its extended position in alignment with the operative end portion of the handle to move the cover away from the support frame and the disposable bag.

2. A structure according to claim 1 wherein said retaining ring is pivotally mounted to the operative end portion of the handle.

* * * * *